Figure 1:
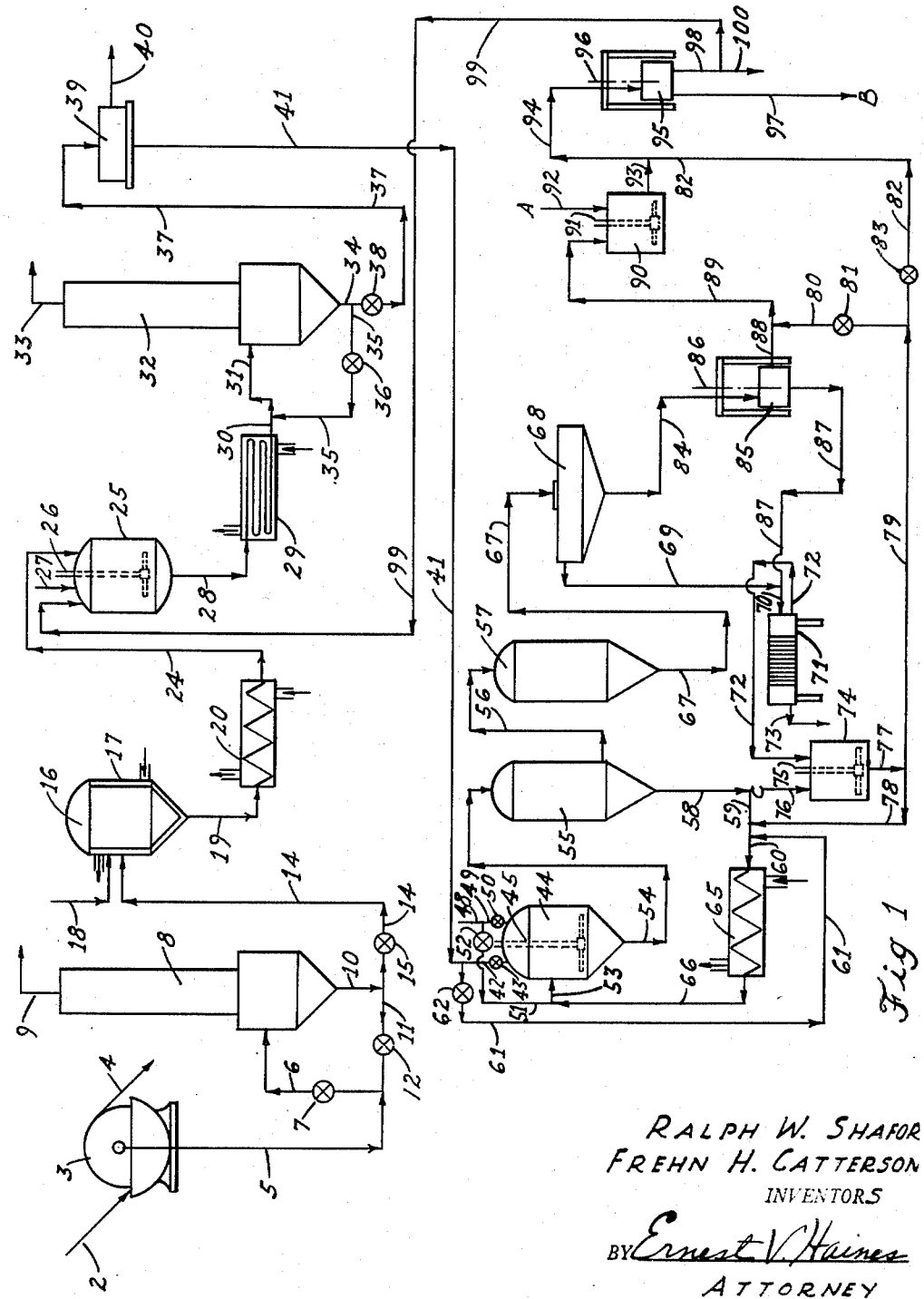

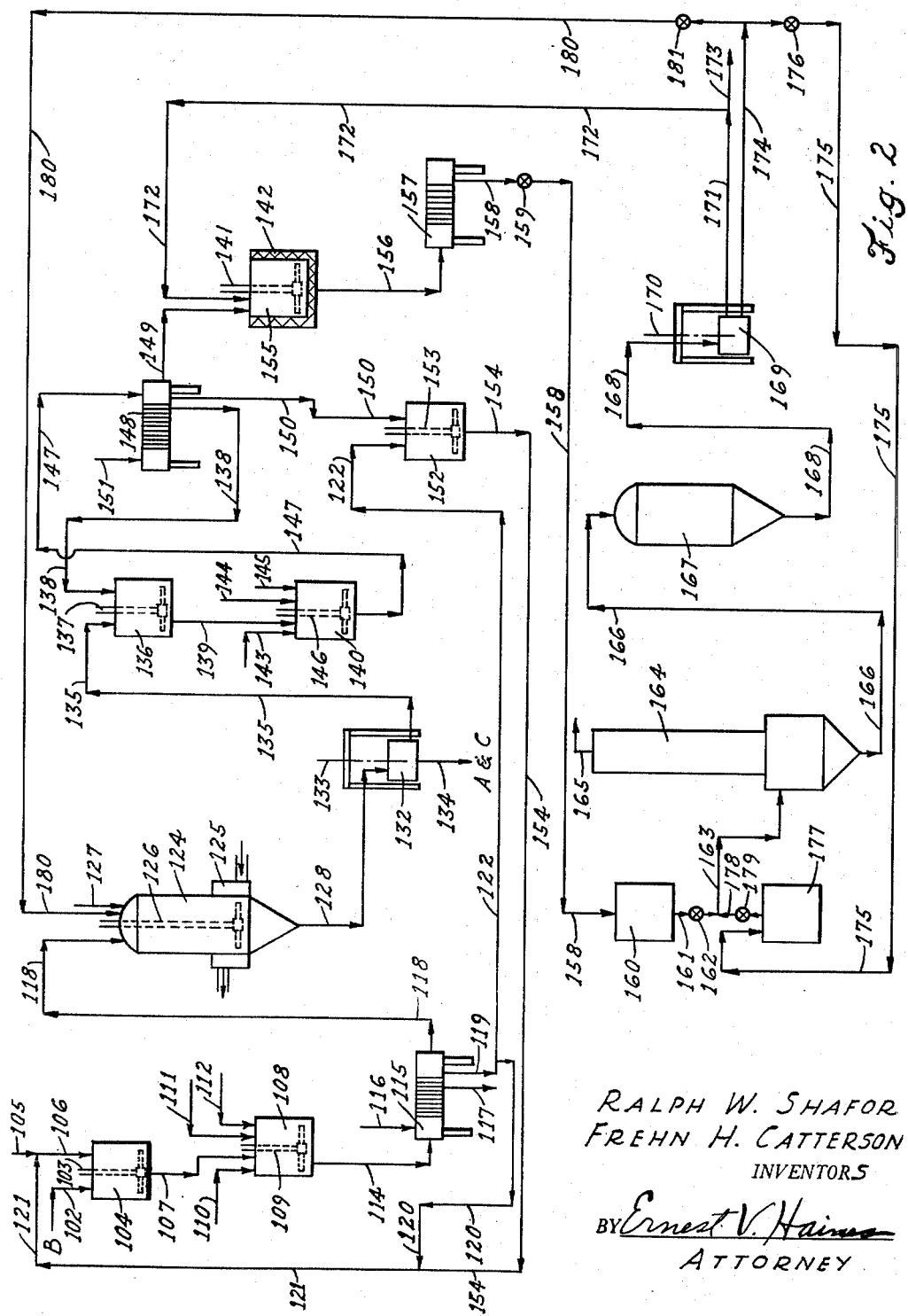

Patented Aug. 8, 1950

2,517,601

UNITED STATES PATENT OFFICE 2,517,601

CRYSTALLIZATION OF GLUTAMIC ACID DERIVED FROM HYDROLYSATES

Ralph W. Shafor, Los Gatos, and Frehn H. Catterson, San Jose, Calif., assignors to International Minerals & Chemical Corporation, a corporation of New York Application May 15, 1948, Serial No. 27,326

13 Claims. (Cl. 260—527)

This invention relates to the process of producing and recovering glutamic acid from the waste liquors obtained in the refining of sugar from sugar beets. More particularly, the process relates to the production of l(+) glutamic acid and to the recovery of the same in purified form suitable for conversion into mono sodium glutamate which finds wide usage in the food industry. In particular, Steffen's filtrate or concentrated Steffen's filtrate is the raw material employed in the instant process.

In the past, numerous processes have been proposed for the production and recovery of l(+) glutamic acid from these source materials. U. S. Patents 1,947,563 and 1,940,428 are representative of previous processes employed in this connection. In these processes, however, considerable difficulty has been encountered in recovering high yields of l(+) glutamic acid (formerly identified in the literature as d-glutamic acid) and also considerable difficulty has been encountered in refining or processing the crude glutamic acid to a sufficient degree so that upon its conversion to mono sodium glutamate through the conventional treatment with caustic soda, a product of high purity and suitable for human consumption was produced. In previous processes, difficulties have been encountered in separating inorganic salt impurities effectively, in crystallizing crude glutamic acid from the resulting liquors, and in purifying the crude glutamic acid sufficiently to afford the required purity of product without sacrificing the high yields required for commercial operation. Generally the lower yields of crude and purified glutamic acid are encountered where the mother solutions are of a low degree of purity since, in general, impurities tend to inhibit crystal growth, thus retarding and lowering the yields of glutamic acid theoretically obtainable from these mother liquids. There is great difficulty, particularly in processes dealing with concentrated Steffen's filtrate as the raw material, in processing so as to recover economic yields of the potential glutamic acid contained therein. In the past, high losses of glutamic acid have been encountered in these processes. Such losses have been occasioned through inaccurate or insufficient control of the pH's of the various solutions through improper crystallization procedures and through inability to effectively separate solids from liquids and to recover residual quantities of the desired solids or liquids before discarding the undesired portions to waste.

It is an object of the present invention to improve the yields of purified glutamic acid recoverable from concentrated Steffen's filtrate.

It is a further object of the invention to produce glutamic acid of a sufficient high degree of purity such that it may be converted to mono sodium glutamate through conventional treatment with caustic and so that the resulting mono sodium glutamate will be of a sufficiently high degree of purity to be usable in the food industry.

Other objects will be fully apparent upon a further understanding of the invention as hereinafter outlined in greater detail.

The invention is characterized by certain improvements in the process of treating concentrated Steffen's filtrate with alkali, purifying, and recovering glutamic acid from the resulting hydrolysate. Broadly speaking, the invention comprises the following process:

Concentrated Steffen's filtrate, which may range in pH and specific gravity quite widely (depending upon the particular source of the material) but generally having a specific gravity of about 1.32 and a pH of about 9.0 to about 9.5, is filtered to remove therefrom any organic salts which may have precipitated during the storage of the concentrated Steffen's filtrate. To this material (which, incidentally, has a dry substance content of between about 60 and about 70 weight percent) there is added sufficient caustic soda solution, usually about 50% aqueous solution to give a pH of between about 10.0 and about 11.0. This material is then subjected to hydrolysis at a temperature of between about 80° and about 95° C. for a period of time ranging between about 2 and about 3.5 hours. Generally speaking, the hydrolysis is carried out at atmospheric pressure. However, the time and temperature conditions may be altered or may remain the same, depending upon the pressure employed. In the past, this alkaline hydrolysis of concentrated Steffen's filtrate has been carried out under super-atmospheric pressures, either autogenously produced or even under pressures higher than this. It is apparent to those familiar with the process that the time and temperature conditions may be altered, depending upon the pressure employed.

The hydrolyzed mixture may then be rapidly cooled or quenched to a temperature of between about 30° and about 45° C. so as to prevent or inhibit, insofar as possible, undesirable side-reactions such as racemization. Sufficient 32–34% hydrochloric acid or acid of any suitable concentration is added to the cooled hydrolysate so as to give to the hydrolysate a pH of between about 5 and about 6, preferably about 5.4. The cooled, acidified hydrolysate is then subjected to a concentration or evaporation, employing as short a retention time in the evaporator or concentrator as possible; usually the dry substance contained in the effluent from the evaporator section ranges between about 70% and about 75% by weight and has a specific gravity measured at about 60° C. of between about 1.355 and about 1.345. The concentrate from the evaporator is between about 65° C. and about 70° C. and it has been evaporated sufficiently that a substantial portion of the inorganic salts are crystallized therein.

The foregoing mixture is subjected to any suitable operation such as centrifugation or filtration for the removal of the inorganic salts from the composition. The filtrate from the separation is then treated in a unique way with a further quantity of hydrochloric acid of the previously mentioned strength, or any other suitable mineral acid, in an amount sufficient to give to the solution a pH ranging between about 3.1 and about 3.3, preferably about 3.2. One of the novel features of the present invention resides in the removal of inorganic salts after evaporation as a step intermediate the initial addition of acid and the second addition of acid to the hydrolysate.

A further novel feature of the instant invention resides in the manner in which the second addition of acid (to reduce pH to about 3.2 and thereby initial crystallization of glutamic acid) is accomplished.

In a system comprising a series of pre-mixing and retention tanks, a circulating pump and a cooling coil, a quantity of previously produced crude crystallizer feed having a pH of approximately 3.2, a temperature between about 25° and about 40° C., preferably about 30° C., and carrying in suspension precipitated glutamic acid crystals, is maintained in circulation. In other words, effluent slurry from the last of the series of tanks is returned through the pump and cooler to the first or pre-mixing tanks of the series.

At a suitable point in the circulating system, preferably in the pre-mixing tanks, solution coming from the inorganic separation operation (said solution having a pH of about 5.4, which is to be reduced to about 3.2, and a temperature of about 65° C.) is introduced to become a part of the circulating mixture. Coincidentally and in a like manner, the quantity of 32% hydrochloric acid required to maintain the pH of the resulting mixture at about 3.2 is introduced. Care must be exercised to avoid localized "supersaturations" of each of these additions within the resulting mixture, which condition may be avoided by providing adequate turbulence at the points of addition.

The volume ratio of recirculated slurry to solution feed should be in excess of 5 to 1, preferably in excess of 10 to 1. Obviously, a quantity of slurry must be withdrawn from the system equal to the volume of the products introduced thereto, and this withdrawal is preferably made coincidentally with said additions. With a continuous feed there is a continuous "overflow" from the system. As a further aid to the formation of larger crystals, the addition of previously produced seed crystals of relatively small size is to be recommended. The ratio of crystals to feed is not critical so long as the resulting mixture remains sufficiently fluid to permit of pumping and cooling. The pump employed for circulating the slurry delivers on the pressure side between about 120 and about 170 gallons per minute, preferably about 150 gallons per minute. The number of crystallizers or hold-up tanks arranged in series and interconnected is not critical. Generally about three are employed in ordinary practice, but the number may range between about two and about eight. The hold-up time in the circulating slurry averages between about 0.5 and 1.5 days.

The portion of the slurry withdrawn for further processing is passed to a series of aging tanks ranging in number between about two and about 8, where it is allowed to stand for between about 70 hours and about 140 hours, preferably about 120 hours, at a temperature of between about 25° and about 40° C., during which time the glutamic acid crystals are permitted to grow to the point of substantial equilibrium with the mother liquor. The resultant crystal slurry is then subjected to a thickening operation in which a rough separation of crystals from mother liquor is effected. In addition, the tank or thickener employed acts to some extent as surge tank, since the entire process is operated as a continuous or semi-continuous process. Thick slurry effluent from the thickener or surge tank, as the case may be, is centrifuged either in a basket or bowl-type machine so as to separate the larger-sized crystals and retain the same while allowing the smaller-sized crystals to pass on through with the filtrate or with the overflow in the case of the bowl-type centrifuge. The screen backing employed in the basket-type centrifuge may be of any acid-resistant material such as stainless steel, Monel metal, and the like. A preferred backing for the basket centrifuge is made of stranded twill weave stainless steel cloth, known to the trade as A U Braid. The overflow from the thickener or surge tank is combined with the effluent from the centrifuge and passed through a polishing filter press or other suitable separation step, in order to segregate the fine crystals from the mother liquor. A portion or all of this filter cake is slurried with a portion of the circulating slurry previously described, and the resulting slurry is employed as the seed slurry introduced into the crude glutamic acid circulating slurry system. Filtrate from the polishing filter press is sewered or is available as raw material for recovery of values other than glutamic acid. That portion of the filter cake from the polishing filter press which is not employed for make-up slurry in the crude glutamic acid circulating crystallizing slurry may be combined with the centrifuge cake and repulped therewith, either using fresh water for the purpose or wash water from a subsequent step in the process involving the washing of a filter press containing residual quantities of glutamic acid values. In the repulping operation, however, a minimum quantity of liquid is desired in order to minimize, insofar as possible, the load placed on the centrifuge to which the repulped material is passed. After centrifugation, the cake is then slurried with wash water and filtrate obtained after a final filtration from the subsequent purification of the glutamic acid, and this slurry which has a pH between about 3.1 and about 3.3, preferably 3.2, is subjected to the following purification treatment:

The repulped crude glutamic acid slurry at the above-mentioned pH is introduced into a mixing tank together with a sufficient quantity of decolorizing agent, for example activated carbon either as a slurry or in a dry condition, a suitable quantity of filter aid, either dry or as a slurry, and sufficient 50% caustic soda aqueous solution to give a pH to the mixture of between about 5.7 and about 6. The mixture is maintained at a temperature of between about 50° and about 65° C. for a period generally between about 1 and about 2 hours, and is agitated during this period. Temperature and time conditions are not critical but the mixing should be carried out under such conditions as to give thorough contact of the solution with the decolorizing agent. The mixture is then passed to a filter press or to another suitable separation device for removal of the filter aid, the decolorizing agent such as activated carbon, and the impurities that are contained therein. The resulting solids are washed with water and these washings employed in the preceding step of repulping the centrifuged glutamic acid cake previously described. The cake is then removed from the filter press or suitable separation device, slurried with water, and sewered.

The filtrate from the filter press or other suitable separation device is then introduced into a circulating slurry stream of glutamic acid crystals which is set up and maintained with a series of crystallizers, cooling tanks and pumps at a pH of between about 3.1 and about 3.3, preferably about 3.2. The operation of this circulating slurry system is substantially identical with that previously described with respect to the crystallization of crude glutamic acid, and here again sufficient hydrochloric acid is introduced into the system to maintain the pH as above stated. As in the case of crystallization of the crude glutamic acid, it is operated so that for every volume of incoming liquids to the system a similar quantity of liquid is withdrawn from the system with the recycle ratio being between about 5 and about 15 volumes for each volume introduced, preferably about 10 volumes for each volume introduced. In general, the slurry is maintained within the crystallization system for about 9 hours average time and the system is maintained at about atmospheric temperature. The withdrawn slurry is, as in the case of the crude glutamic acid crystallization, introduced into aging tanks where an equilibrium between mother liquor and crystal is allowed to be substantially obtained after which the slurry is centrifuged or filtered. The solid cake is then washed with water, and the wash water and filtrate combined and employed as make-up liquid for slurrying and repulping the first centrifuge cake of crude glutamic acid crystals. The solid cake of purified glutamic acid crystals may either be dried for marketing, with suitable screening operations being employed, if desired; or the cake in a semi-dry condition may be further processed to produce mono sodium glutamate.

The purified glutamic acid may be converted into mono sodium glutamate in the following manner:

To a slurry of purified glutamic acid in water there is added sufficient 50% caustic soda solution, filter aid and decolorizing slurry, for example activated carbon, to give a pH to the solution of about 7; sufficient colorizing agent being added to obtain as filtrate a water-white solution substantially free of impurities. This slurry is agitated and held at a temperature of about 50° to about 55° C. for a period of about 1 to about 2 hours, after which it is filtered and washed with water. The wash water is then returned either directly or indirectly to the previous mixing tank while the filter cake may be slurried with water and employed for economic reasons as a portion or all of the decolorizing agent employed in the purification of crude glutamic acid. The filtrate from the filter press is substantially water-white in color and is relatively free of impurities, comprising essentially only an aqueous solution of mono sodium glutamate. To this solution there may be added any undesirable-sized crystals of mono sodium glutamate previously recovered. The concentrated mono sodium glutamate solution is then subjected to a system of several stages (preferably about four) of alternate evaporation and crystallization, with the filtrate or overflow from the centrifuge becoming, after each crystallization, the liquor evaporated in the succeeding evaporation stage. Four separate strikes of crystals may be recovered, with those recovered from the last strike being of a slightly lower degree of purity than the first strike of crystals. Generally, however, the differential of purity between the first and last strike of crystals is not sufficiently great to require the rejection of any of the crystal yields so far as their use for food purposes is concerned. If such is the case, however, the last strike or last two strikes of crystals may be subjected to a purification treatment such as, for example, the recycling of these crystals to the decolorizing treatment in the mixing tank previously described or a separate decolorization ahead of the first evaporation of the substantially neutral solution of mono sodium glutamate. The centrifuged mono sodium glutamate crystals from the first and second strikes are combined, dried, screened, and packaged according to the desired specifications for sizes. The filtrated or overflow together with wash water from the cake, if desired, may be introduced upon proper acidification to between about 3.1 to about 3.3, preferably 3.2, with hydrochloric acid into the purified glutamic acid crystallization system.

If desired, and if the purified mono sodium glutamate solution is of sufficient purity, a single-stage evaporation and single-stage crystallization may be employed, with the filtrate and washings being de-introduced upon proper acidification, as described, into the purified glutamic acid crystallization system; but it is preferred to employ the fourth stage alternate evaporation and crystallization previously described, since the degree of purity of the representative crystal strikes may be more accurately controlled, and only those yields of mono sodium glutamate crystals of highest purity processed and removed from the system, for marketing. It is not intended that the invention be limited to any number of stages of evaporation and crystallization, since a single or plurality of stages may be conveniently employed depending upon the other factors previously mentioned.

In order to more fully and completely illustrate the character of the invention, the accompanying drawings will be explained:

Figure 1 represents in sectional elevation a diagrammatic plan of the flow of materials through the process up to the point where crude glutamic acid is produced.

Figure 2 likewise represents a sectional elevation of a diagrammatic flow plan starting with the crude glutamic acid and showing the production of the finished mono sodium glutamate.

Concentrated Steffen's filtrate as it is received from the beet sugar producers is introduced into the system through line 2 into a suitable filtering apparatus 3 which may be a pre-coat filter having a knife-edge 4 for the removal of the solids contained in the Steffen's filtrate. The clarified filtrate from the filter 3 is conducted by means of line 5 into line 6 through valve 7 and is concentrated in evaporator 8, which is provided with a vapor outlet 9, down to the point where it has a solids content of between about 60 and about 70 weight percent. This may be done on a continuous scale by recycling all or a portion of the evaporator contents through lines 10 and 11 controlled by valve 12 and re-introduced into evaporator 8 by means of line 6 controlled by valve 7. All or a portion of the contents of evaporator 8, upon attaining the proper concentration and solids content, is withdrawn through line 14, controlled by valve 15, into a hydrolyzer 16 having a heating jacket 17. A suitable caustic or other alkaline solution is introduced into the hydrolyzer by means of line 18. As previously stated, this hydrolysis is carried out at a temperature between about 80° and about 95° C. for between about 2 and about 3.5 hours. The hydrolysate is withdrawn from the hydrolyzer 16 by means of line 19, cooled as rapidly as possible in cooler 20 to a temperature of about 30° to about 45° C., and introduced by means of line 24 into an acidification tank 25 equipped with a mechanical agitator 26. Hydrochloric acid or other suitable mineral acid is then added through line 27 in sufficient quantity to give the solution a pH of between about 5 and about 6, preferably about 5.4. The cooled, acidified hydrolysate is then conducted by means of line 28 into heater 29 where the temperature is raised sufficiently high to give an evaporation upon conducting the heated hydrolysate through lines 30 and 31 into evaporator 32, which may be maintained under a partial vacuum. Vapor from the evaporator is removed from the system by means of line 33. If evaporator 32 is operated on a continuous basis, all or a portion of the hydrolysate being concentrated is removed through line 34 and recycled by means of line 35 controlled by valve 36 back through line 31 into the evaporator 32. If desired, the contents of line 35 may be reintroduced into the evaporating system by first passing these contents through heater 29 (not shown) in order to maintain the liquid being concentrated at a sufficient temperature to insure evaporation and concentration of the liquid in evaporator 32 to a point at least sufficient to give incipient crystallization of the inorganic salts contained in the hydrolysate. The effluent finally removed from the evaporating system through line 37 controlled by valve 38 has a solids content ranging between about 70 and about 75% and constitutes between about 50 and about 53% of the liquid weight subjected to concentration in evaporator 32. Inorganic salt crystals have formed during this concentration in evaporator 32, so that upon conducting the slurry by means of line 37 into a suitable separation operation (for example, centrifuge 39) a substantial inorganic cake is removed, as represented by line 40, with the filtrate from centrifuge 39 being conducted by means of line 41 into a second acidification tank 44, wherein acid is introduced thereinto by means of line 48, either directly into the acidifying tank 44 by means of line 49 controlled by valve 50, or first into a recycle stream, to be hereinafter described, by means of line 51 controlled by valve 52. Not only may the effluent from centrifuge 39 be conducted by means of lines 41 and 42 and valve 43 directly into acidifying tank 44, but in addition all or a portion of the effluent in line 41 may be conducted into a recycle stream, to be hereinafter described, by employing line 61 controlled by valve 62. Sufficient hydrochloric acid is added through line 48, as previously described, in order to give the total solution a pH ranging between about 3.1 and about 3.3. A circulating slurry of glutamic acid crystals and mother liquor is maintained in the acidifier or mixing tank 44. This is withdrawn from the tank through line 54 and introduced into crystallizer 55 which may be a single crystallizing tank or a plurality of crystallizing tanks interconnected in series with crystallizing tank 55 which serves as a retention tank, or a series of retention tanks. The slurry is withdrawn through line 58 and recycled as a slurry to the mixing and acidifying tank 44 by passing through lines 59 and 60, cooler 65, line 66, and line 53. This establishes a circulating or recycling circuit of crystallizing slurry in which a continuous crystallizing of glutamic acid is maintained with crystals being formed and nuclei being enlarged or built upon so as to give a satisfactory crystal structure for ease of processing later on. The temperature maintained in the circulating system ranges between about 25° and about 40° C., preferably about 30° C. The solution entering through line 41 is generally at a temperature of about 65° C. The introduction of the contents of line 41 into the circulating system by means of line 61, and introduction of acid by means of lines 48 and 51, is designed to avoid localized supersaturations of each of these additives while at the same time preventing the redissolution of the crystals already formed without producing large quantities of any nuclei of glutamic acid. Adequate turbulence is maintained at the points of addition by means of the recycle pump (not shown) usually, though not necessarily, located in line 60 or line 53. The ratio of recirculated slurry to solution feed should be in excess of 5 to 1 by volume, preferably in excess of 10 to 1. As a further aid to the formation of large glutamic acid crystals, the addition of previously produced seed crystals of relatively small size is useful. These are added to the system through line 78, as will be more fully explained hereinafter. A constant volume of liquid is maintained in this circulating slurry so that for the volumes of liquid added through lines 41, 48, and 78, an equivalent volume is simultaneously withdrawn from the system through line 56 where the slurry so withdrawn is introduced into aging crystallizers 57, which may be one or preferably a plurality of aging tanks in which the newly formed crystals are permitted to build up into larger-sized crystals over a period of several days. The aging crystallizing tank, or tank 57, after retaining the crystallizing slurry for a period of between about 70 and about 140 hours at a temperature between about 25° and about 40° C., is withdrawn through line 67 into thickener 68 where a preliminary and crude separation between liquid and solids is carried out. The liquid overflow from thickener 68 contains a few small crystals of glutamic acid. These are conducted by means of line 69 and line 70 into a polishing filter 71 which may be of the plate-and-frame type. The filtrate from filter 71 is withdrawn by means of line 73 and discarded. The crystals recovered are introduced into mixing tank 74 equipped with mechanical agitator 75 by means of line 72 and are slurried with a purified glutamic acid filtrate introduced at point C into mixing tank 74 by means of line 76. All or a portion of this slurry, upon being withdrawn from mixing tank 74, may be returned to the crystallized recycled slurry for use as seeding solution by conducting the same from line 77 through line 78 into line 59. That portion of this slurry which is not employed for seeding purposes is conducted by means of line 79 into further operations at subsequent points of the process wherein the glutamic acid crystals are recovered and purified, as will be hereinafter more fully explained.

The crystal slurry withdrawn from the bottom of thickener 68 is conducted by means of line 84 into a suitable solids separation device, for example centrifuge 85 equipped with a centrifugal basket 86. Usually the filtrate from centrifuge 85 contains some quantities of very fine crystals of glutamic acid which have passed through the wire screen backings of the basket 86. This slurry is therefore conducted by means of line 87 into line 70 and from there into polishing press 71, from whence the recovered glutamic acid crystals are processed as previously described with reference to the crystals recovered from the liquid overflow from thickener 68 which is carried to press 71 by means of lines 69 and 70. The crude glutamic acid crystals from centrifuge 85 are passed by means of lines 88 and 89 into a repulping tank 90 equipped with mechanical agitator 91. The slurry produced in mixing tank or repulping tank 74 may be conducted, either in whole or in part, by means of lines 79 and 80 and valve 81, into admixture with the crude glutamic acid crystals coming from centrifuge 85 by means of lines 88 and 89. In addition, all or a portion of the filtrate coming from the purified glutamic acid, and which was described with reference to point C and line 76, may also be introduced at point A through line 92 into the repulping or slurrying tank 90. Reference may be found in Figure 2 to line 134 from which source the filtrate A or C is derived. The slurry from tank 90, together with any desired quantities of slurry from line 79 and which by-passes tank 90 by means of line 82 controlled by valve 83, is conducted into centrifuge 95 by means of lines 93 and 94. It is preferred to employ the slurry in line 79 in making up the slurry in tank 90. However, it is within the scope of the present invention to add this slurry from line 97 directly to the effluent from tank 90 as represented by line 82 controlled by valve 83. The centrifuge 95 may be of any convenient type, but a basket centrifuge such as that specifically shown gives satisfactory results. The centrifuge 95 is therefore equipped with a basket 96 into which the slurry from line 94 is introduced. The crude cake accumulating on the centrifugal basket 96 is washed, repulped, and conducted by means of line 97 to point B in Figure 2. The filtrate, which still contains substantial quantities of glutamic acid values as well as impurities, may be either discarded by means of lines 98 and 100, but preferably it is conducted by means of lines 98 and 99 back to the first acidification station represented by acidifying tank 25 equipped with mechanical agitator 26, where it is used to lessen the over-all amount of acid required to be added through line 27 in order to give the desired pH to the effluent in line 28 of between about 5 and about 6.

Referring now to Figure 2, the crude product at point B is introduced by means of line 102 as a slurry into a mixing tank which may be a combined repulping tank and mixing tank 104. This tank is equipped with a mechanical agitator 103 for thorough mixing of the ingredients. Filtrates and aqueous solutions of glutamic acid in partially purified form, washings from filter presses, and the like are introduced into the system by means of lines 105 and 106 in order to form this slurry mixture which is pumped through line 107 into mixing tank 108 equipped with mechanical agitator 109, where decolorizing carbon or other suitable decolorizing agent is introduced thereinto by means of line 111. Filter aid, if desired, may also be introduced through line 112. Sufficient alkaline solution, such as a 50% aqueous caustic soda solution, is added in order to give the mixture a pH between about 5.7 and about 6. The mixture is then agitated for a period between about 1 and about 2 hours at a temperature between about 50° and about 65° C. Though these times and temperatures are not critical, they are designed to give a thorough contact of the solution with the decolorizing agent. This slurry is then passed through line 114 into a suitable solids-liquids separation device such as a plate-and-frame filter press 115. The carbon cake accumulating on the plates of this press is washed with water, introduced through line 116 and withdrawn through line 119. This wash water may be recycled back to slurrying or mixing tank 104 by means of lines 120 and 121. Preferably, however, this wash water is conducted by means of line 122 into a subsequent step in the process, all as will be hereinafter more fully described. The washed carbon cake containing any filtrate employed is discarded from the system through line 117. The filtrate from press 115 is conducted by means of line 118 into crystallizing tank 124 or a plurality of crystallizing tanks connected in series (not shown) which are equipped with jackets 125 for cooling the contents of the crystallizer 124. In these crystallizers, acid is added through line 127 and a mechanical agitator 126 is employed to avoid local supersaturation. Sufficient acid is added to give a pH of between about 1 and about 3.3. Although the drawing does not show it, this tank 124 is analogous to tank 44 in Figure 1; and, if desired, the same system for crystallizing this purified glutamic acid may be employed as was employed in connection with Figure 1 in crystallizing the crude glutamic acid therein. In other words, the system in Figure 1 of tank 44, line 54, crystallizer 55, lines 58, 59, and 60, cooler 65, lines 66 and 53, may be employed in Figure 2 for crystillizing the purified glutamic acid. The acid introduced in line 127 is analogous to the acid introduced in line 48. The liquor in which crystals are to be formed, denoted in Figure 2 as line 118, is analogous to line 41 of Figure 1. Similarly, aging crystallizers of the type of crystallizers 57 of Figure 1 may be interposed between crystallizers 124 and centrifuge 132. On the average the slurry in Figure 2, and of which crystallizer 124 is a part, is maintained within the crystallizer system for about 9 hours average time. The use of tanks at some point in line 128 corresponding to the aging tanks 57 in Figure 1 may be dispensed with if the equilibrium between mother liquor and crystals has been substantially maintained during the recirculation of the slurry. The slurry introduced into centrifuge 132 by means of line 128 is recovered in basket 133, and the filtrate withdrawn through line 134 is employed in the process as shown in Figure 1 at points A and C, i. e. lines 92 and 76, respectively. The purified glutamic acid crystals are withdrawn from centrifuge 132 through line 135 and introduced into a slurrying or mixing tank 136 equipped with a mechanical agitator 137. The liquid into which the purified crystals are slurried is introduced thereinto from line 138. Only a small amount of this liquid obtained from a subsequent washing of filter cake is required. The slurry is pumped or otherwise conducted by means of line 139 into mixing tank 140 where fresh activated carbon or other decolorizing agent is added through line 145, filter aid is added through line 144, and sufficient caustic soda solution is added through line 143 to give the solution a pH of about 7. A sufficient amount of fresh decolorizing agent is added through line 145 so as to give a final water-white solution substantially free of impurities. Mixing tank 140 is equipped with mechanical agitator 146, and the slurry therein is agitated for about 1 to 2 hours at a temperature of about 50° to about 55° C. Though these times and temperatures are not critical, a sufficient contact time should be employed to allow the decolorizing agent the full opportunity of doing its work. The slurry is conducted into a suitable plate-and-frame press 148 by means of line 147. Filter aid and carbon, as well as impurities, are retained on the plates, the cake is washed with water introduced through line 151, and this wash water is used in the process of slurrying the mixture in tank 136 to which it is conducted by means of line 138. The washed, spent filter cake is removed from press 148 by means of line 150, introduced into a repulping or slurrying tank 152 equipped with a suitable means of agitation such as agitator 153. The wash water from the first carbon filter press 115 is conducted by means of lines 119 and 122 into the repulping tank 152. The slurry of decolorizing agent (for example, activated carbon) is conducted by means of line 154 into line 121 and from there through line 106 into the mixing tank or repulping tank 104, where it is used a second time for initial purification of the crude glutamic acid. Depending upon the amount of decolorizing agent used in mixing tank 104 and slurried back through lines 154, 121, and 106, the amount of fresh decolorizing agent introduced through line 111 may be varied. The second use of the decolorizing agent is satisfactory and economical as well.

The filtrate from press 148 is conducted by means of line 149 into a mixing tank 155, which is equipped with an agitator 141 and a heating jacket 142, where it is combined with non-marketed, subsequently produced crystals of mono sodium glutamate. The solution is, of course, water-white in color and relatively free of impurities comprising essentially only an aqueous solution of mono sodium glutamate. The solution is conducted by means of line 156 through a polishing filter press 157 for the removal of any further small quantities of solids which might be contained therein. The water-white, solids-free liquid is then conducted by means of line 158 controlled by valve 159 into storage tank 160 from which a multi-stage operation is carried out involving various strikes of mono sodium glutamate crystals.

The first strike of crystals is conducted as follows: Liquid from storage tank 160 is conducted through line 161 controlled by valve 162, and by means of line 163 into the evaporator 164 provided with a vapor outlet 165. The solution is concentrated to the point of incipient crystallization of mono sodium glutamate and then withdrawn from evaporator 164 through line 166, from whence it is introduced into the crystallizer 167 where it is allowed to stand with cooling to crystallize the mono sodium glutamate in the mother liquor. A single crystallizer 167 is shown. It is to be understood, however, that a plurality of such crystallizers may be employed in series, depending upon the volume of liquid passing through evaporator 164 and through line 166. The crystals coming from crystallizer 167, or a series of crystallizers, are conducted by means of line 168 into a centrifuge 169 which conveniently may be of the basket type and which, in such event, is provided with a rotating basket 170. The white crystals of mono sodium glutamate are removed from the centrifuge by means of line 171. Line 172 is employed to recycle less pure glutamate to mixing tank 155 where it is reintroduced into the system for recovery of further mono sodium glutamate values. The same is true, also, of the fourth strike of crystals which are produced from the filtrate from the third strike of crystals and which is stored in a fourth tank analogous to storage tanks 160 and 177, and which ultimately and batchwise is run through line 163 and processed as before described in connection with the solutions involving the production of a first, second, and third strike of crystals of mono sodium glutamate. The fourth strike of crystals is generally of relatively low purity and is usually recycled back into the system through line 172. Generally speaking, a portion or all of the fourth filtrate from centrifuge 169 is returned to the system by closing valve 176 and opening valve 181, allowing the mother liquor from the fourth strike of crystals to pass through line 180 and thereby combine with the filtrate coming from filter press 115 by means of line 118, so that the two solutions enter crystallizer 124. Also, a portion of the salt from the third strike of crystals may be similarly processed, if desired. In this way, the impurities which are brought up in the final mother liquors from the successive strikes of crystals are recycled to the system and are ultimately removed as impurities through treatment in mixing tank 140 with activated carbon and removed as carbon filter cake from press 148.

Any number of strikes, as desired, and within practical limits, may be taken of mono sodium glutamate crystals from the liquors being processed in evaporator 164, crystallizer 167, and centrifuge 169, as above described. For practical convenience, however, it has been found advantageous to concentrate the liquors in four successive stages with the recovery of four strikes of mono sodium glutamate crystals. A fewer number than four strikes or a greater number than four strikes may be employed, depending upon the ultimate purity which is desired in the final mono sodium glutamate product produced and marketed.

In describing the process flow by means of the drawings, conventional equipment additions have been purposely omitted in the interests of simplification. It is, of course, readily understood and apparent that various solid-wall type centrifuges may be employed in place of basket centrifuges; pre-coat rotary filters may be employed in place of plate-and-frame filter presses for separating solids from liquids; and numerous valves, pumps, liquid-level and flow-recording meters, thermometers, heaters, coolers, etc. will be used in actual operations and are contemplated herein, though not specifically disclosed in the drawings. For the sake of simplicity alone, slurry mixers, mixing tanks, and the like are shown equipped with mechanical propeller-type agitators. Any suitable conventional agitation device may be employed in lieu of those shown. Numerous other specific but conventional details not shown are omitted in the interests of simplicity and ease of understanding.

In general, no specific or special types of equipment, pumps, valves, and the like are required; but in order to avoid contamination of the product it is desirable to employ acid-resistant materials such as stainless steel, Monel metal, or rubber as coatings or linings, or as the inner element of the structure of the various pieces of equipment, particularly in those cases where acidic slurries or solutions are encountered. In general, it is also desirable, for economical reasons, to recycle in the crude glutamic acid production process filtrate wash water and the like from a succeeding operation to some prior point in the system, so as to cut down or minimize glutamic acid losses. Thus, for example, end liquors and wash waters from the glutamic acid purification system, glutamic acid repulps, crude glutamic acid centrifuging, and the repulping of the inorganic salt cake, may be returned in whole or in part and re-introduced into the first acidification to a pH of between about 5 and about 6 of the alkaline hydrolysate. It will be appreciated that the process may be separated on a batchwise basis, a continuous basis, or a semi-continuous basis. As is already known, acids other than hydrochloric acid, such as sulfuric acid or phosphoric acid, and alkalis other than caustic soda, such as caustic potash, calcium hydroxide, etc., may be employed to accomplish the recovery of the glutamic acid values from concentrated Steffen's filtrate. However, complications arise by virtue of the use of these reagents with regard to the separation of the resulting salts, thereby making it necessary to alter or modify the procedures specifically outlined. Such modifications and procedures are obvious to those skilled in the art, and need not be herein detailed. Also, the use of reagents other than hydrochloric acid and sodium hydroxide produce, in the final analysis, glutamic acid and the metal salts thereof of a lesser degree of utility, in some respects, than is produced when employing the preferred reagents.

Wherever in this specification and accompanying claims the terms "glutamic acid," or "mono sodium glutamate," or analogous terms are used, it is intended that these substances refer to the l(+) optical form.

We claim:

1. A process of crystallizing glutamic acid, which comprises maintaining a circulating slurry stream of glutamic acid crystals and mother liquor at a pH of between about 3.1 and about 3.3, said stream containing a mixing zone and at least one hold-up zone, adding to the mixing zone a solution of glutamic acid prepared from a hydrolysate of material containing combined glutamic acid and which upon adjustment to said pH will crystallize out glutamic acid, maintaining the said pH of the circulating slurry stream by the addition to the mixing zone of a mineral acid non-oxidizing under the conditions obtaining and withdrawing a portion of the circulating slurry stream.

2. A process as in claim 1, wherein the volume of the circulating slurry stream is maintained substantially constant while continuously introducing the glutamic acid-containing solution, and continuously withdrawing a portion of the circulating slurry stream.

3. A process as in claim 1, wherein the volume of the circulating slurry stream is maintained substantially constant while continuously introducing therein glutamic acid-containing solution, continuously withdrawing a portion of the circulating slurry stream, and wherein between about 5 and about 15 volumes of slurry is circulated per volume of liquid introduced into said circulating slurry stream with substantially equal volumes of slurry being withdrawn from the stream as is introduced thereinto.

4. A process which comprises maintaining a continuous circulating slurry stream of glutamic acid crystals and mother liquor at a pH of between about 3.1 and about 3.3, said stream containing a mixing zone and a plurality of interconnected hold-up zones, adding to said stream at the mixing zone a solution of glutamic acid prepared from a hydrolysate of material containing combined glutamic acid and which upon adjustment to the said pH will crystallize out glutamic acid, simultaneously adding to the mixing zone sufficient mineral acid non-oxidizing under the conditions obtaining to maintain the said pH, and withdrawing a portion of the circulating slurry at a point beyond the first hold-up zone.

5. A process as in claim 4, wherein a seed crystal slurry of glutamic acid is introduced into the circulating slurry stream before the mixing zone but after at least one hold-up zone.

6. A process as in claim 4, wherein a seed slurry of glutamic acid formed from small glutamic acid crystals and a portion of the circulating slurry stream is introduced into the circulating slurry stream before the mixing zone but after at least one hold-up zone.

7. A process as in claim 4, carried out continuously and wherein the temperature of the circulating slurry stream is maintained between about 25 and about 40° C.

8. A process as in claim 4, carried out continuously wherein the circulating slurry stream is maintained between about 25 and about 40° C., and wherein between about 5 and about 15 volumes of circulating slurry stream is circulated per volume of liquid introduced into the circulating slurry stream.

9. A process which comprises hydrolyzing concentrated Steffen's filtrate with caustic soda at an elevated temperature, quenching the hydrolysate, acidifying the quenched hydrolysate with hydrochloric acid to a pH between about 5 and about 6, evaporating the acidified mixture to the point of crystallizing inorganic salts therefrom, separating inorganic salts from the concentrated acidified hydrolysate maintained at the said pH, maintaining a circulating slurry stream of crystallizing glutamic acid and mother liquor, said stream containing a mixing zone and at least one hold-up zone, adding to the mixing zone hydrolysate substantially free of inorganic salt crystals while maintaining the pH of said circulating stream at the point between about 3.1 and about 3.3 by the simultaneous addition of hydrochloric acid to the mixing zone, and recovering glutamic acid crystals from the stream.

10. A process of crystallizing glutamic acid, which comprises maintaining a circulating slurry stream of glutamic acid crystals and mother liquor at a pH of between about 3.1 and about 3.3, said stream containing a mixing zone and at least one hold-up zone, adding to the mixing zone a solution of glutamic acid prepared from a hydrolysate of material containing combined glutamic acid and which upon adjustment to the said pH will crystallize out glutamic acid, maintaining the said pH of the circulating slurry stream by the simultaneous addition to the mixing zone of a mineral acid non-oxidizing under the conditions obtaining, withdrawing a portion of said circulating slurry stream and aging the same, recovering glutamic acid crystals from said aged slurry, and re-introducing a portion of said crystals as seed crystals into the circulating slurry stream at a point before the mixing zone but after at least one hold-up zone, and recovering that portion of the aged glutamic acid crystals not returned to the circulating slurry stream.

11. A process of producing glutamic acid which comprises subjecting concentrated Steffen's filtrate to an alkaline hydrolysis, acidifying the hydrolysate with mineral acid non-oxidizing under the conditions obtaining to a pH of between about 5 and about 6, evaporating the acidified composition at least to the point of inorganic salt crystallization, separating inorganic salts directly therefrom, maintaining a circulating slurry stream of crystallizing glutamic acid and mother liquor, said stream containing a mixing zone and at least one hold-up zone, adding to the mixing zone hydrolysate substantially free of inorganic salt crystals while maintaining the pH of said circulating slurry stream at between about 3.1 and about 3.3 by the simultaneous addition of further amounts of said mineral acid to the mixing zone, withdrawing at least a portion of said circulating slurry stream and aging the same, recovering glutamic acid crystals from the aged slurry, and returning a portion of said crystals as seed to the circulating stream at a point ahead of the mixing zone but after at least one hold-up zone, and recovering the remaining portion of the aged glutamic acid crystals.

12. A process as in claim 11, wherein the aged crude glutamic acid crystal slurry is subjected to a basket centrifuge operation, the basket backing being sufficiently porous to permit the smaller glutamic acid crystals to remain with the effluent, separating these smaller crystals from mother liquor, slurrying at least a portion of said crystals with a portion of the glutamic acid crystallizing circulating slurry stream, and introducing this slurry as seed slurry into the circulating crude glutamic acid crystallizing stream.

13. A process as in claim 11, wherein the aged crude glutamic acid crystal slurry is subjected to a basket centrifuge operation, the basket backing being sufficiently porous to permit the smaller glutamic acid crystals to remain with the effluent, separating these smaller crystals from mother liquor, slurrying at least a portion of said crystals with a portion of the glutamic acid crystallizing circulating slurry stream, and introducing this slurry as seed slurry into a circulating crude glutamic acid crystallizing stream at a point in the stream other than the mixing zone.

RALPH W. SHAFOR.
FREHN H. CATTERSON.

REFERENCES CITED

The following references are of record in the file of this patent:

UNITED STATES PATENTS

| Number | Name | Date |
|---|---|---|
| 1,940,428 | Masuda | Dec. 19, 1933 |
| 1,947,563 | Masuda et al. | Feb. 20, 1934 |
| 1,990,769 | Barnett | Feb. 12, 1935 |
| 2,178,210 | Mark | Oct. 31, 1939 |
| 2,194,302 | Gerber | Mar. 19, 1940 |
| 2,214,115 | Bishop et al. | Sept. 10, 1940 |
| 2,373,342 | Royal | Apr. 10, 1945 |
| 2,433,219 | Hoglan | Dec. 23, 1947 |